W. JONES.
COMBINATION MILK PAIL, FILTER, AND STRAINER.
APPLICATION FILED JAN. 28, 1911.
1,005,432.
Patented Oct. 10, 1911.
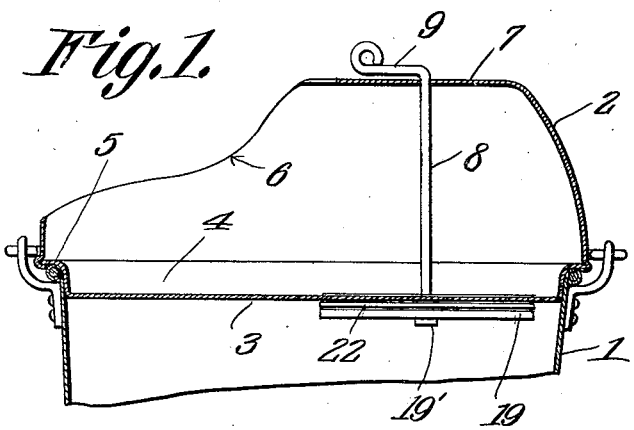
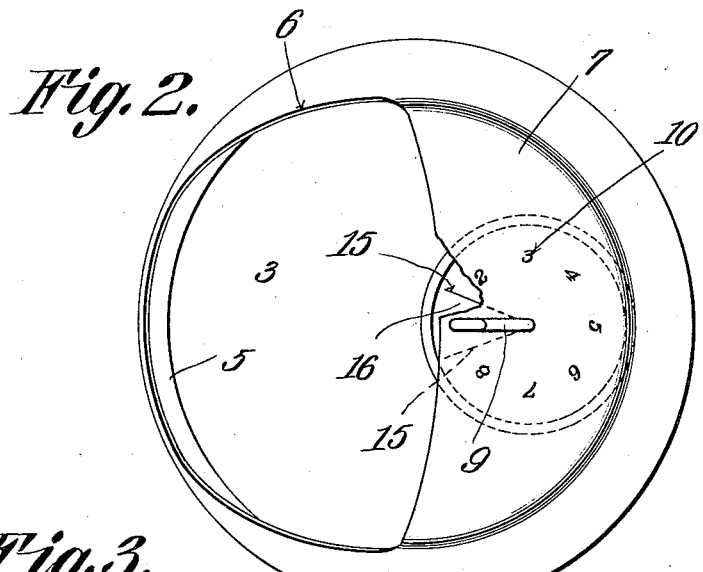
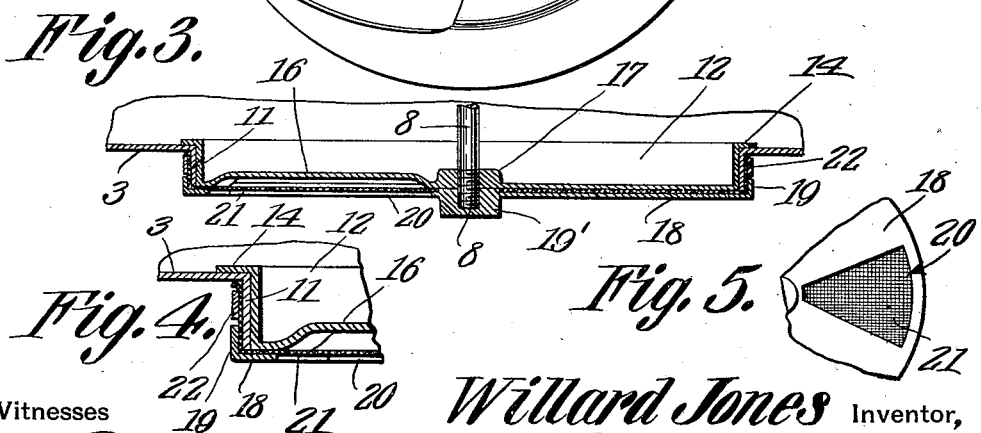
Witnesses
Willard Jones Inventor,
by C. A. Snow & Co.
Attorneys.

UNITED STATES PATENT OFFICE.

WILLARD JONES, OF AUBURN, MAINE.

COMBINATION MILK PAIL, FILTER, AND STRAINER.

1,005,432.  Specification of Letters Patent.  Patented Oct. 10, 1911.

Application filed January 28, 1911. Serial No. 605,302.

*To all whom it may concern:*

Be it known that I, WILLARD JONES, a citizen of the United States, residing at Auburn, in the county of Androscoggin and State of Maine, have invented a new and useful Combination Milk Pail, Filter, and Strainer, of which the following is a specification.

It is the object of this invention to provide a strainer structure adapted to be maintained upon a milking pail, the construction being such that one section after another of the strainer may be presented to the milk, thereby permitting the operator to substitute a clean portion of the strainer, for one which has become slightly soiled.

Another object of the invention is to provide means whereby the operator may be positively assured that a clean section of the strainer is presented to the milk.

Another object of the invention is to provide a rotatable strainer, the parts of which coöperate with each other, to prevent an accidental displacement of any of said parts.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a vertical transverse section, parts being shown in elevation; Fig. 2 is a top plan, parts being broken away; Fig. 3 is a vertical transverse section, showing the rotatable and fixed portions of the strainer; Fig. 4 is a sectional detail enlarged from Fig. 3; and Fig. 5 is a fragmental plan of the auxiliary strainer head.

In the drawings, the numeral 1 denotes a milk pail, upon which the strainer structure is adapted to be placed. The strainer structure includes a hood 2 and a bottom 3, the bottom 3 being depressed below the hood to form a flange 4, adapted to fit closely within the pail 1, the periphery of the bottom 3 being outwardly extended to form another flange 5 adapted to overhang the upper edge of the pail, the flanges 4 and 5 obviously coöperating to prevent the entrance of filth between the periphery of the strainer structure and the periphery of the pail. The hood 2 is cut away as shown at 6 to permit the milk to pass within the hood 2 and to fall upon the bottom 3.

Journaled for rotation in the top 7 of the hood, is a shaft 8, formed at its upper end with a laterally projecting arm 9, adapted to secure a rotation of the shaft 8, and to register successively upon graduations 10, inscribed upon the top 7 of the hood 2.

The bottom 3 is equipped with a depending neck 11 within which is journaled for rotation, the strainer head 12, the same having an outstanding flange 14, overlapping the bottom 3. The head 12 is closed in its bottom portion, saving for two radial slits 15, the constituent material of the head 12 being elevated slightly between the slits 15, as shown at 16, to permit the milk to pass through the head 12. In its central portion, the head 12 is equipped with a boss 17, through which the lower end of the shaft 8 is threaded.

An auxiliary head 18 is mounted upon the neck 11, the head 18 having a flange 19, inclosing the neck 11. The head 18 is provided with a boss 19', into which the lower end of the shaft 8 is threaded, the construction being such that when the shaft 8 is rotated, the heads 12 and 18 will be rotated likewise. In the head 18 there is a sectorial opening 20, the radial edges of which define the same angle as the slits 15 in the head 12, the engagement between the shaft 8 and the heads 12 and 18 serving to maintain the edges of the opening 20, and the slits 15 in alinement. Interposed between the head 18 and the lower edge of the neck 11, is a fine mesh screen 21, the periphery of which is carried upwardly about the neck 11, a ring 22 inclosing the screen 21 to hold the same in place upon the neck.

In practical operation, the milk, entering the opening 6 in the hood 2 will fall upon the bottom 3 of the strainer structure, and at this point it may be noted that owing to the slitted construction of the head 12, as indicated at 15, it will be impossible for the stream of milk to impinge directly against the screen 21. The milk, then, flowing along the bottom 3, will pass through the slits 15, thence through the screen 21, and finally through the sectorial opening 20 in the head 18, into the pail 1. When it is desired to substitute a clean section of the screen, the extension 9 of the shaft 8 is moved to register upon another of the graduations 10, the operator being thus assured positively that a clean section of the screen 21 has been presented by the rotation of the heads 12 and 18. By reason of the fact that the auxiliary head 18 fits closely against the screen 21, the milk will be compelled to pass directly through the opening 20, any soiling of the screen 21, beyond the edges of the opening 20, being thus avoided.

It will be noted that when the shaft 8 is threaded into engagement with the heads 12 and 18, these heads will be bound firmly in place against accidental displacement, the flange 19 of the head 18 preventing the ring 22 from displacement. It is therefore impossible for the screen 22 to drop accidentally into the milk which is within the pail 1.

Having thus described the invention what is claimed is:—

1. In a device of the class described, a hood; a shaft journaled for rotation therein; a fixed screen secured to the hood; and a strainer head secured to the shaft and having an opening adapted to be positioned above successive portions of the screen when the shaft is rotated.

2. In a device of the class described, a hood having an opening; a screen secured across the opening; a shaft journaled for rotation in the hood; and spaced heads secured to the shaft and disposed upon opposite sides of the screen, the heads having alined openings.

3. In a device of the class described, a hood provided with an opening; a screen secured across the opening; heads disposed upon opposite sides of the screen; and means for securing the heads together, for simultaneous rotation; there being an opening in one head, and slits in the other head, alined with the edges of the opening.

4. In a device of the class described, a hood having an opening surrounded by an outstanding neck; a screen extended across the neck; a ring embracing the neck and binding the screen thereagainst; a head disposed above the screen; a head disposed below the screen and provided with an upstanding flange surrounding the neck, to prevent a displacement of the ring; and means for securing the heads together for simultaneous rotation upon the neck, there being alined openings in the heads.

In testimony that I claim the foregoing as my own, I have hereto affixed my signature in the presence of two witnesses.

WILLARD JONES.

Witnesses:
CORNELIA PULSIFER,
ETHEL M. HATCH.

Copies of this patent may be obtained for five cents each, by addressing the "Commissioner of Patents, Washington, D. C."